June 23, 1953      J. C. BRADLEY      2,643,279
SEPARATOR PROTECTOR
Filed Nov. 18, 1949

INVENTOR:
JAMES C. BRADLEY
BY:
*Edward J. Dwyer*
ATTORNEY

Patented June 23, 1953

2,643,279

UNITED STATES PATENT OFFICE 2,643,279

SEPARATOR PROTECTOR

James C. Bradley, Oreland, Pa., assignor to The Electric Storage Battery Company, a corporation of New Jersey Application November 18, 1949, Serial No. 128,183

7 Claims. (Cl. 136—177)

The invention relates to improvements in secondary or storage battery cells and, more particularly, to devices for protecting the separators inserted between the plates contained in such cells.

In the construction of many types of storage batteries, the positive and negative plates are, conventionally, separated by diaphragms that are pervious to electrolytic transfer of ions and yet impervious to the passage of active material that may become dislodged from such plates. To provide a barrier to the formation of "trees" i. e. build up of active material, and consequent short circuits at the edges, top, or bottom of the plates, the separator is generally produced in such dimensions as to extend beyond the edges of the plates wherever possible.

It will be understood that in the choice of a separator for use in a given cell several factors must be considered. On one hand, the separator must be of sufficient thickness to minimize breakage during handling and to prevent short circuits through the material itself. On the other hand, it is necessary, because of space limitations and the desirability of maintaining the internal resistance of the cell at a minimum, to use as thin a separator as possible. It has been found that separators, as thin as, for example, a few one-thousandths of an inch may be satisfactory as regards both the above considerations. With such separators, however, another problem arises, namely, due to the extension of the upper edges of the separator above the top of the plates, careless insertion of a hydrometer, thermometer or filling device during a filling or testing operation is likely to break down such upper edges thereby providing a path for possible short circuits between the plates.

Devices intended to prevent separator breakage are known in the art, all such devices, however, are of the type that must be placed on top of the element, or fastened to the underside of the cover, before the cover is attached to the jar. While these devices have been satisfactory insofar as protection against separator breakage is concerned, a great deal was left to be desired from the production standpoint. To place the protector on top of the element prior to placing the cover on the jar meant that great care and accuracy had to be used so as not to disturb the position of the protector when completing assembly. Furthermore, affixing the protector to the underside of the cell cover entailed the molding of interengaging threads or the like on the respective parts, an operation of decided economic disadvantage.

It is, therefore, an object of the invention to provide a simple, inexpensive device for protecting the separators within a storage battery cell, which device can be placed in position after assembly of the cell.

A further object of the invention is to provide a separator protector of the type insertable through an aperture in a storage battery cell cover and that will positively affix itself thereto after assembly of the cell.

An additional object of the invention is to provide a separator protector of the type insertable through the filling opening of a storage battery cell a portion of which protector will be positioned accurately at the minimum desirable electrolyte level within such cell and another portion of which will be positioned at the maximum desirable electrolyte level and will, therefore, serve the dual function of separator protection and electrolyte level indication.

Other objects of the invention will be apparent from the description and claims that follow.

In the drawing, like numerals are used to indicate like parts.

Figure 1:
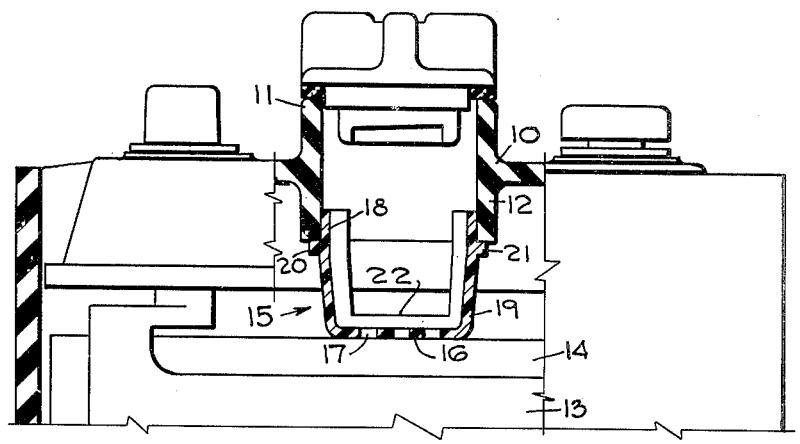
Figure 1 is an elevational view of a storage battery cell section showing the separator protector in cross section positioned therewithin.
Figure 2:
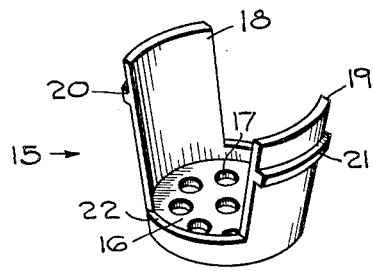
Figure 2 is a perspective view of the separator protector shown in Figure 1.

Referring now to the drawing, particularly Figures 1 and 2, the numeral 10 indicates the cover of a storage battery cell, such cover having an opening therein surrounded by an upstanding boss or collar 11 and a depending skirt 12. The cell contains a plurality of plates indicated generally at 13 having separators 14 inserted between adjacent plates and extending above the upper edges thereof.

Positioned partially within the lower portion of skirt 12 is a separator protector designated as 15 constructed in the preferable form of my invention. Separator protector 15 comprises, as shown in Figures 1 and 2, a base portion 16 perforated as at 17 and provided with upstanding portions or arms 18 and 19 respectively. The arms 18 and 19 are formed respectively with external shoulders 20 and 21 spaced from the upper ends thereof. Base portion 16 is further provided with rim 22 so that, if it is desired to ascertain the temperature of the electrolyte, a thermometer can be placed on base 16 and permitted to remain there without the danger of the end of the thermometer slipping off the base into the cell.

Separator protector 15 is preferably molded as a unit from any desirable resilient, acid resistant material such as polyethylene, polystyrene, semi-hard rubber, or like substances. It will be noted in this connection that the protector is so designed as to be capable of being molded by any conventional injection or transfer molding process, there being no parts to interfere with the withdrawal of the core from the mold cavity.

In order to permit protector 15 to be inserted through boss 11 and skirt 12, base portion 16 is slightly smaller in diameter than the internal diameter of said boss and skirt. Arms 18 and 19, being fabricated from a resilient material as hereinbefore described, can be compressed until the distance across shoulders 20 and 21 is equivalent to or slightly smaller than the inside diameter of boss 11. Protector 15 can then be pushed downwardly until shoulders 20 and 21 clear the lower end of skirt 12 at which time the shoulders will no longer be compressed and the arms will spring outwardly toward their original position thus securing the protector within and below the skirt.

It should be noted that, as is clearly shown in Figure 1, protector 15 is adapted to abut the top of separators 14 and the distance from the bottom of the protector to the upper side of shoulders 20 and 21 is gauged to be substantially equivalent to the distance from the top of separator 14 to the bottom of skirt 12. It is, as a general rule, desirable to maintain the electrolyte level at a point that will completely immerse the plates and the separators. Accordingly, the minimum desirable electrolyte level is at the point just above the tops of the separators. Protector 15 is, therefore, an electrolyte level indicator in that if no electrolyte level indicator is visible within the protector, it is an indication that the electrolyte is below the desired minimum and should be replenished.

On the other hand, there is a point that can be termed the maximum desirable electrolyte level beyond which the liquid level should not be permitted to rise. There is, therefore a range between the minimum and maximum electrolyte levels within which it is satisfactory to maintain such level. In accordance with my invention this range is determined to be coextensive with the height of the protector i. e. from base portion 16 to the upper ends of arms 18 and 19. Since the upper ends of the arms grip skirt 12 internally thereof, it can easily be determined when the electrolyte reaches the upper ends of the arms i. e. the maximum desirable level, and the filling operation discontinued. It will readily be understood that protector 15 can, if desired, be colored in such a manner as to contrast with the interior of skirt 12, such skirt and boss 11 being conventionally made of hard rubber and black.

Figure 3:
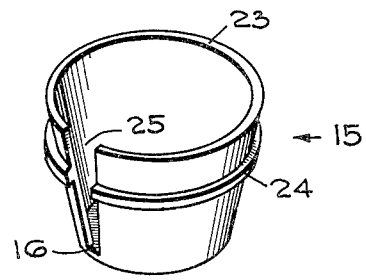
Figure 3 is a perspective view of a modification of the device shown in Figures 1 and 2.

Figure 3 relates to a modification of the protector shown in Figures 1 and 2, in which arms 18 and 19 shown in the previously discussed figures are replaced by circular wall 23 upstanding from base portion 16 and provided with external shoulder 24 in a manner similar to and for the same purposes as shoulders 20 and 21 on arms 18 and 19 respectively. Wall 23 is vertically slotted as at 25 to permit compression of wall 23 to an extent that shoulder 24 will clear the upper end of boss 11. In this embodiment, a rim such as that indicated as 22 in Figures 1 and 2 is unnecessary since the same function will be carried out by wall 23, the width of vertical slot 25 being so gauged as to prevent any thermometer from slipping therethrough. Accordingly, base portion 16 may be solid instead of perforated since electrolyte will enter protector 15 through slot 25.

Figure 4:
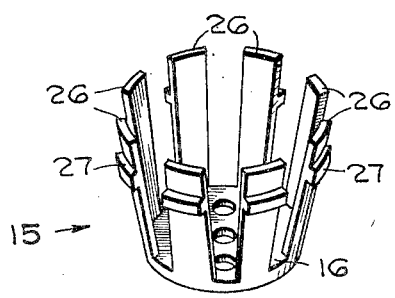
Figure 4 is a perspective view of a further modification of my invention.

Figure 4 discloses a slightly different embodiment of the invention wherein arms 18 and 19 or wall 23 are replaced by a plurality of relatively slender arms designated generally 26 each having an external shoulder 27 and spaced equi-distant around the circumference of base portion 16. Arms 26 and shoulders 27 fulfill the same function as arms 18 and 19 in Figures 1 and 2 and wall 23 in Figure 3. Here again, as in Figure 3, the arms can be positioned so as to prevent a thermometer from slipping therebetween, in which case no rim is necessary on base portion 16 and, as a result, perforations 17 can be eliminated.

In view of the above description, it is apparent that I have achieved the purposes of the invention by providing a separator protector insertable through an opening in a storage battery cell cover after assembly of the cell and which fulfills the dual functions of separator protection and electrolyte level indication.

The examples here given and the description set forth are merely presented as illustrative of and not as a limitation on the present invention. Other forms and variation coming within the scope of the appended claims will readily suggest themselves to those skilled in the art.

I claim:

1. In a storage battery cell including a cell cover having an opening therein a depending skirt surrounding said opening and alternate plates and separators, a device for protecting said separators comprising a base portion insertable through said opening, and resilient skirt contacting means associated with said base portion, said resilient means being in compressed frictional contact with said skirt.

2. In a storage battery cell including a cell cover having an opening therein, a depending skirt surrounding said opening, and alternate plates and separators, a device for protecting said separators comprising a base portion insertable through said opening, and a resilient side portion upstanding therefrom and frictionally contacting the lower portion of said skirt, and being compressed thereby.

3. A device in accordance with claim 2 wherein the resilient side portion is provided with an external shoulder to engage the lower end of said skirt.

4. In a storage battery cell including a cell cover having an opening therein, a depending skirt surrounding said opening, and alternate plates and separators, a device for protecting said separators comprising a base portion insertable through said opening, and at least two resilient arms upstanding from said base portion and frictionally contacting the lower portion of said skirt, and being compressed thereby.

5. A device in accordance with claim 4 wherein each of said arms is provided with an external shoulder to engage the lower portion of said skirt.

6. In a storage battery cell including a cell cover having an opening therein, a depending skirt surrounding said opening and alternate plates and separators, a device for protecting said separators comprising a base portion insertable through said opening, and at least two resilient arms upstanding from said base portion and frictionally contacting the lower portion of said skirt, and being compressed thereby said base portion being at the minimum desirable electrolyte level and the upper end of said arms being at the maximum desirable electrolyte level.

7. A device in accordance with claim 6 wherein each of said arms is provided with an external shoulder to engage the lower portion of said vent well.

JAMES C. BRADLEY.

References Cited in the file of this patent

UNITED STATES PATENTS

| Number | Name | Date |
|---|---|---|
| 1,938,989 | Woodbridge | Dec. 12, 1933 |
| 2,257,514 | Raney | Sept. 30, 1941 |
| 2,276,091 | Reppert | Mar. 10, 1942 |

FOREIGN PATENTS

| Number | Country | Date |
|---|---|---|
| 356,944 | Italy | Feb. 23, 1938 |
| 598,413 | Great Britain | Feb. 18, 1948 |